Feb. 25, 1941.    H. GOLDSMITH    2,233,096

VALVE FOR INFLATABLE ARTICLES

Filed July 27, 1939

INVENTOR.
HUGO GOLDSMITH.
BY Allen & Allen
ATTORNEYS.

Patented Feb. 25, 1941

2,233,096

UNITED STATES PATENT OFFICE 2,233,096

VALVE FOR INFLATABLE ARTICLES

Hugo Goldsmith, Cincinnati, Ohio, assignor to Sport Products, Inc., Cincinnati, Ohio, a corporation of Ohio Application July 27, 1939, Serial No. 286,871

3 Claims. (Cl. 273—65)

This invention relates to valves for inflatable articles and particularly to rubber valves for use in combination with inflatable game ball bladders.

In the art there has been considerable development in the use of rubber valves with inflatable game balls. The theoretical possibilities of rubber valve constructions are limitless but the practical determination of the value of the valve must always be dependent on two things. The first is that the valve must not leak. The second is that the valve must be accessible for inflation without the necessity of manipulation which has to be carried out with scientific accuracy. Many of the valves which have been provided in the past are theoretically leakproof and theoretically may be manipulated for inflation without difficulty; but in fact to be serviceable in the production of playing balls in large quantities the valves must be so constructed that slight inaccuracies in construction do not result in leakage in one out of a great number of balls.

A valve construction may be satisfactory for twenty-four out of twenty-five game balls, but if the twenty-fifth ball leaks that is sufficient to throw out that type of construction as a practical valve for such article.

It is the object of my invention to provide a valve construction which will be simple to assemble, simple to manipulate during inflation and which will be leakproof to a high degree of accuracy.

It is another object of my invention to provide a valve which will be susceptible of inflation by a needle, and which will be provided with means for storing within the confines of the valve sufficient lubricant to permit the use of an inflating needle which does not carry any lubricant on it.

It is an object of my invention to provide a casing for a valve inflating needle which will automatically lubricate the shaft of the needle during withdrawal of the needle for use.

There has in the past been some development in the provision of rubber valves having lubricant wells which are to be filled with lubricant and which automatically lubricate an inflating passing through the well. It has been my experience that the use of valves having wells filled with lubricant permit the flow of lubricant out through the valve passage so that it smears up the outer surface of the ball and renders it greasy. In contrast to this it is the object of my invention to provide a well designed only to pick up a minimum supply of lubricant from the outer wall of the inflating needle so that in case the inflating needle becomes dry, sufficient lubricant will be supplied from the well to lubricate the needle during its passage to the slit which forms the air seal.

Another object of my invention is the provision of a valve wherein a plug having an inflating passage is mounted within a hollow stem and in which the inner end of the plug has a stub extending from it which is tensioned by the constriction of the walls of the stem to hold the stub in position to enclose the inflating slit.

The above objects and other objects to which reference will be made in the ensuing description I accomplish by that certain combination and arrangement of parts of which I have shown a preferred modification.

Referring to the drawing.

Figure 1:
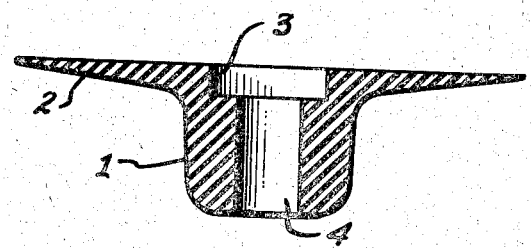
Fig. 1 is a sectional view of the hollow stem showing the flange for attachment to the bladder.
Figure 2:
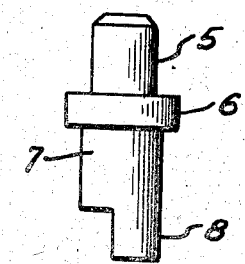
Fig. 2 is a side elevation of the plug.

Referring first to Fig. 1, the stem of the valve 1 is composed of elastic material of substantial mass, and there is integrally formed therewith a flange 2 which is used for adhesive attachment to the bladder or other inflatable article. A recess 3 extends down from the flange side of the stem as indicated and from the bottom of the recess a cylindrical passage 4 of reduced diameter extends down to the end of the stem.

The plug which fits within the stem has an extension 5, an annular flange 6 which seats within the recess 3, and an inwardly extending portion 7 which is slitted to provide a passage for the inflating needle. The stub 8 extends from the inner end of the portion of the plug indicated at 7.

Figure 3:
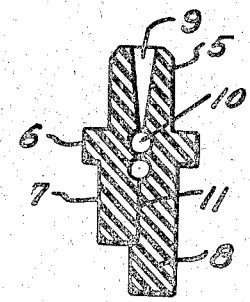
Fig. 3 is a sectional view of the plug shown in Fig. 2.

Referring to the sectional view of the plug as indicated in Fig. 3, a tapering passage 9 extends down from the outer end of the extension 5 and is connected at the base with a well 10 preferably formed by two concavities located centrally of the flange portion of the plug, and from which an inflating slit 11 extends down to the end of the portion 7.

Figure 4:
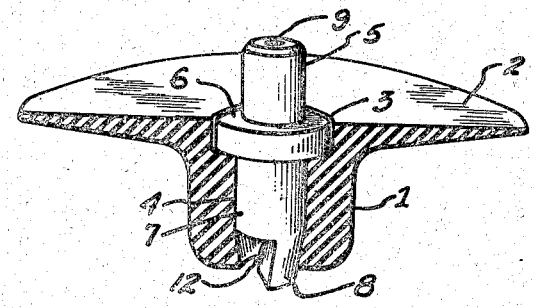
Fig. 4 is a perspective view with parts in section showing the construction of the assembly.

Referring to Fig. 4, it will be observed that the portion 7 of the plug is restricted by the walls of the stem 1 and that the stub 8 is bent over so that it is in the position indicated at 12 whereby the slit emerges and there is a compression tending to seal the slit. The plug portion 7 being of a larger diameter than hole 4, is forced into position by means of an expansion tool that has been devised to slip into hole 4.

Figure 5:
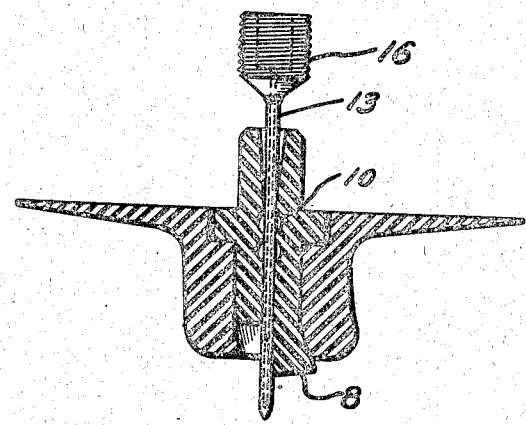
Fig. 5 is a view as shown in Fig. 4 showing the position of the parts during inflation.

Referring to Fig. 5, it will be observed that when an inflating needle such as is indicated at 13 is extended through the slit, the stub 8 is bent back permitting the slit to open. It is during such position of the inflating needle that inflation of the bladder is accomplished. With the removal of the needle the stub 8 springs back to the position indicated in Fig. 4 which seals the slit extending through the stem.

Figure 6:
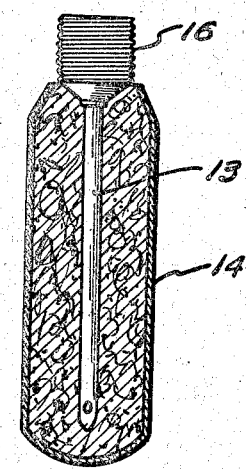
Fig. 6 is a sectional view of a receiver for containing lubrication for the inflating needle.

In Fig. 6 I have indicated a container for the inflating needle. This comprises a shell 14 packed with wick-like material, which is saturated with lubricant. The inflating needle 13 fits in a hole down through the wicking which acts as a seat to hold the stem when the stem is not in use. The stem is of the usual type having a threaded end 16 which may be screwed to the tube of a pump.

The operation of the assembly illustrated and described will be obvious. When it is desired to inflate the article by means of the valve, the stem 13 is screwed onto a pump. The stem will carry on its outer walls a thin coating of lubricant which it has picked up from the wicking material.

As the stem of the inflating needle is inserted through the plug a thin coating of lubricant will be retained within the lubricant well in the plug. The lubricant facilitates the movement of the needle through the slit 11 without likelihood of tearing the rubber.

As soon as the article is inflated the inflating needle is withdrawn and replaced in its container. If the inflating needle is not removed from the pump tube and the lubricant on the outer walls of the needle becomes wiped off sufficient lubricant will be picked up from the well 10 to provide adequate lubrication for a number of inflating insertions.

I have illustrated a simple form of valve which in use has been found to be substantially foolproof. Repeated usages show that the valve remains leakproof and the lubricant is just about enough to lubricate the inflating needle without causing sufficient lubricant to be present to make leakage likely or the overflowing of the lubricant onto the outer surface of the article.

In the claims which follow it should be understood that my main invention lies in the novel features of the valve construction per se whether or not a lubricating well, such as is indicated at 10, is encased within the plug. I have not shown a drawing of a valve without the lubricating well, but it should be understood that, if no well is provided, the base of the needle receiving passage communicates directly with the inflating slit.

Having thus described my invention what I claim as new and desire to secure by Letters Patent is:

1. A valve for an inflatable article comprising a stem of elastic material of substantial mass provided with a flanged portion for attachment to an inflatable article, and having a recessed portion, the recess of which extends into said stem from parallel alignment with the attaching surface of said flange, and having a cylindrical opening of reduced diameter extending from the bottom of said recessed portion to the inner end of the stem, a plug of elastic material having a flange seated within said recess, said plug having an inflating needle receiving passage extending from the outer end of the plug and terminating in a well located substantially at the center of the flanged portion of the plug, and a slit extending from said well through the plug, said slitted portion of the plug being constricted by the elasticity of said stem, and said plug having a semi-cylindrical stub extending beyond the inner end of said stem and also having the remainder of said plug cut off short of the inner end of said stem, whereby the stub is normally bent over by the constriction of the stem to seal the end of said slitted portion.

2. A valve for an inflatable article comprising a stem of elastic material of substantial mass provided with a flanged portion for attachment to an inflatable article, and having a recessed portion, the recess of which extends into said stem from parallel alignment with the attaching surface of said flange, and having a cylindrical opening of reduced diameter extending from the bottom of said recessed portion to the inner end of the stem, a plug of elastic material having a flange seated within said recess, said plug having an inflating needle receiving passage extending from the outer end of the plug and terminating in a well located substantially at the center of the flanged portion of the plug, and a slit extending from said well through the plug, said slitted portion of the plug being constricted by the elasticity of said stem, and said plug having a semi-cylindrical stub extending beyond the inner end of said stem and also having the remainder of said plug cut off short of the inner end of said stem, whereby the stub is normally bent over by the constriction of the stem to seal the end of said slitted portion, and said well comprising two substantially spherical concavities for an inner connecting passage.

3. A valve for an inflatable article comprising a stem of elastic material of substantial mass provided with a flanged portion for attachment to an inflatable article, and having a recessed portion, the recess of which extends into said stem from parallel alignment with the attaching surface of said flange, and having a cylindrical opening of reduced diameter extending from the bottom of said recessed portion to the inner end of the stem, a plug of elastic material having a flange seated within said recess, said plug having an inflating needle receiving passage extending from the outer end of the plug and terminating in a well located substantially at the center of the flanged portion of the plug, and a slit extending from said well through the plug, said slitted portion of the plug being constricted by the elasticity of said stem, and said plug having a semi-cylindrical stub extending beyond the inner end of said stem and also having the remainder of said plug cut off short of the inner end of said stem, whereby the stub is normally bent over by the constriction of the stem to seal the end of said slitted portion, and said well comprising two substantially spherical concavities for an inner connecting passage, said well being adapted to receive a coating of lubricant and to retain the same during insertion of an inflating needle through said receiving passage and slit.

HUGO GOLDSMITH.